United States Patent [19]

Fuke

[11] Patent Number: 4,694,366
[45] Date of Patent: Sep. 15, 1987

[54] DEVICE FOR SHIFTING CARRIAGE

[75] Inventor: Takamichi Fuke, Furukawa, Japan

[73] Assignee: Alps Electric Co., Ltd., Japan

[21] Appl. No.: 828,204

[22] Filed: Feb. 10, 1986

[30] Foreign Application Priority Data

Feb. 8, 1985 [JP] Japan .............................. 60-16646[U]

[51] Int. Cl.$^4$ .......................... G11B 5/55; G11B 21/08
[52] U.S. Cl. ...................................... 360/106; 360/109
[58] Field of Search .................... 360/106, 97, 99, 109

[56] References Cited

U.S. PATENT DOCUMENTS 4,131,923 12/1978 Wachs et al. ........................ 360/106
4,383,283 5/1983 Machut ............................ 360/106 X Primary Examiner—John H. Wolff
Attorney, Agent, or Firm—Guy W. Shoup

[57] ABSTRACT

A device for shifting a carriage on which the magnetic head of a disk drive is carried, the disk drive being used with magnetic disks. A mating element mounted to the carriage is in resilient contact with a helical groove formed on a threaded shaft. A retaining member having a retaining portion is mounted on the carriage. The retaining portion is usually not in contact with the wall defining the helical groove, but bears against the wall when the shaft stops abruptly or a strong external force is applied, for example. Thus, the mating element is prevented from disengaging from the groove.

4 Claims, 7 Drawing Figures

DEVICE FOR SHIFTING CARRIAGE

FIELD OF THE INVENTION

The present invention relates to a disk drive for storing and retrieving data from magnetic disks which are used for electronic computers, word processors, and the like and, more particularly, to a device for shifting a carriage on which the magnetic head of a disk drive is carried.

BACKGROUND OF THE INVENTION

In recent years, a threaded shaft has been used as a mehanism for intermittently moving a carriage on which magnetic head is carried, radially of a magnetic disk. A recently developed device employing the threaded shaft for moving such a carriage is shown in FIG. 4, where the threaded shaft, indicated by numeral 1, is connected to a stepping motor (not shown). The shaft 1 has a helical groove 2 formed on its outer surface. A mating element 4 mounted to a carriage 3 engages the groove 2. The front end 4a of the mating element 4 takes the form of a somewhat rounded quadrangular pyramid. The mating element 4 is mounted to the central portion 5b of a leaf spring 5 of a U-shaped cross section. Both ends 5a of the spring 5 are rigidly fixed to both side walls of the carriage 3 with threaded members 6 and 7. The mating element 4 is pressed against the groove 2 by the resilient force of the spring 5. Magnetic head 8 is carried on the upper surface of the carriage 3. Two guide shafts 9 and 10 fixedly secured to a chassis (not shown) allow the carriage 3 to be moved parallel to the shaft 1.

In the conventional device as described above, when the shaft 1 is rotated in a forward or reverse direction by the stepping motor, the carriage 3 moves a distance corresponding to the angle through which the shaft 1 rotates, along the guide shafts 9 and 10 rearward or forward because the mating element 4 engages the groove 2, in the manner described below.

As can be seen from FIG. 4, the helical groove 2 is formed so as to run in a direction perpendicular to the axis of the shaft 1. The groove 2 has non-advancing portions 2a, which have a lead angle of 0° and are axially spaced apart from each other. The groove 2 further has advancing portions 2b formed between the non advancing portions 2a, the advancing portions 2b being inclined to the axis of the shaft 1. One rotation of the shaft 1 corresponds to eight non-advancing portions 2a and eight advancing portions 2b. The relation of the distance traveled by the carriage 3 to the angle through which the shaft 1 rotates is shown in FIG. 5. The device is so designed that the stepping motor stops when the angle reaches 0°, 45°, 90°, 135°, 180°, 225°, 270°, and 315° and that the front end 4a of the mating element 4 is located at the center of any non-advancing portion 2a of the helical groove 2 whenever the motor stops as described above. Thus, even if rotary motion is transmitted from the motor while involving some error, or if the motor undergoes damped oscillation after quick stoppage of the motor, it is assured that the carriage 3 stops in position as long as the front end 4a of the mating element 4 engages any non-advancing portion 2a of the groove 2.

As mentioned above, in the prior art techniques, the mating element 4 is held by the leaf spring 5 to bring the element 4 into engagement with the helical groove 2 without rattling. A gap 11 is formed between the central portion 5b of the spring 5 of a U-shaped cross section and the body of the carriage 3. Therefore, when the shaft 1 is rotated fast or stopped quickly or a large external shock is applied to the shaft 1, the leaf spring 5 may be bent excessively as shown in FIG. 6. Then, the mating element 4 may disengage from one of the roots of the groove 2 and ride on its neighboring crest or even ride over this crest and engage its neighboring root. This will prevent the magnetic head 8 from being correctly moved in a stepwise manner. As a result, correct tracking on the magnetic disk is rendered difficult. Further, when an external shock is applied, the mating element 4 may be accelerated while kept away from the groove 2. Then, the carriage 3 will collide on the chassis of the disk drive or other component, so that the carriage 3, the magnetic head 8, and other components will become damaged.

SUMMARY OF THE INVENTION

Accordingly, it is the object of the present invention to provide a device which prevents the mating element of a carriage from disengaging from the helical groove on a threaded shaft when a large external shock is applied, allows accurate shift of the carriage, and prevents the carriage and other components from becoming damaged.

The above object is achieved by a carriage-shifting device comprising: a mating element 4 mounted, to the carriage 3 on which magnetic head 8 is carried; a threaded shaft 1 having a helical groove 2 with which the mating element 4 is in resilient contact, the carriage 3 being moved in given steps along a straight line by rotating the shaft; and a retaining member 11 mounted on the carriage and acting to prevent the mating element 4 from disengaging from the groove 2.

The retaining member 11 is fixed to the carriage 3 and has a retaining portion 11b that is always disposed in the helical groove 2. When a strong external shock is applied and the leaf spring 5 bends, the mating element 4 is about to disengage from the groove 2. Then, the retaining portion 11 bears against the wall defining the groove 2, stopping the mating element 4 from disengaging.

DETAILED DESCRIPTION OF THE INVENTION

Figure 1:
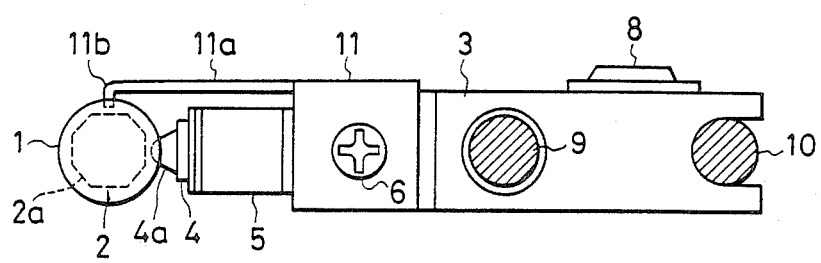
FIG. 1 is a front elevation of a carriage-shifting device according to the invention.
Figure 2:
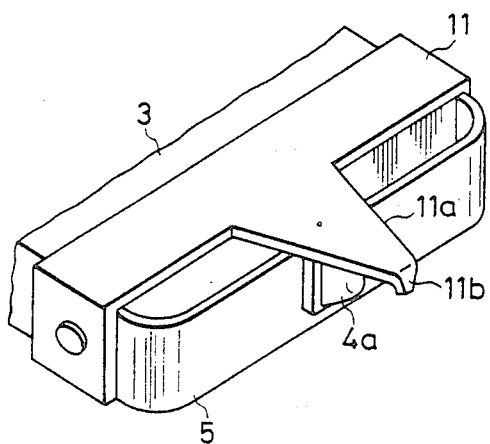
FIG. 2 is a fragmentary perspective view of the device shown in FIG. 1.
Figure 3A:
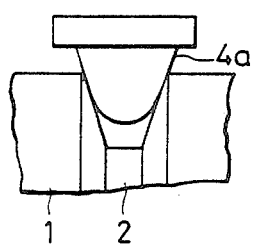
FIG. 3 (A) and 3(B) are fragmentary plan view and side elevation, respectively, of the device shown in FIG. 1, for showing the positional relation of the mating element and the retaining member to the helical groove.
Figure 3B:
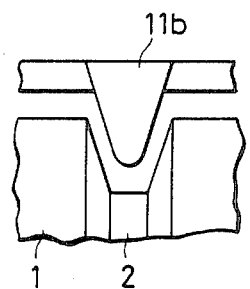
Figure 4:
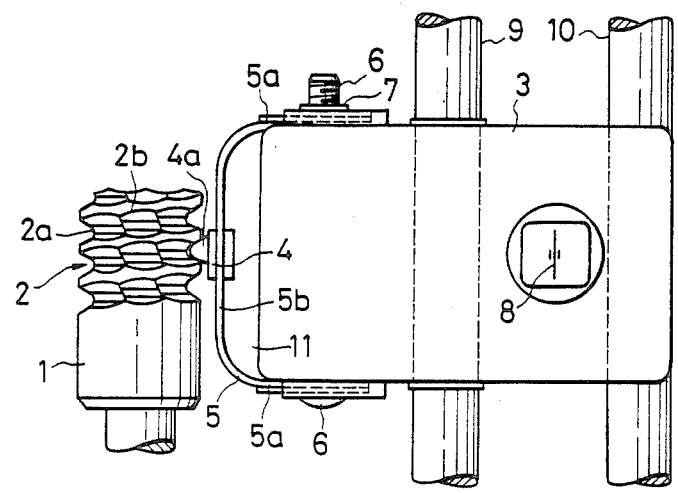
FIG. 4 is a plan view of a conventional carriage-shifting device.
Figure 5:
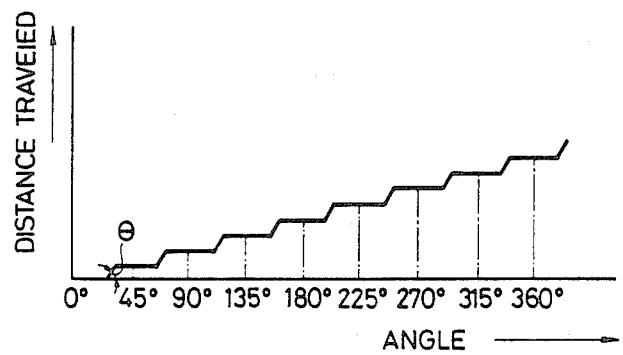
FIG. 5 is a graph showing the relation of the distance traveled by the carriage of the device shown in FIG. 4 to the angle through which the threaded shaft rotates.
Figure 6:
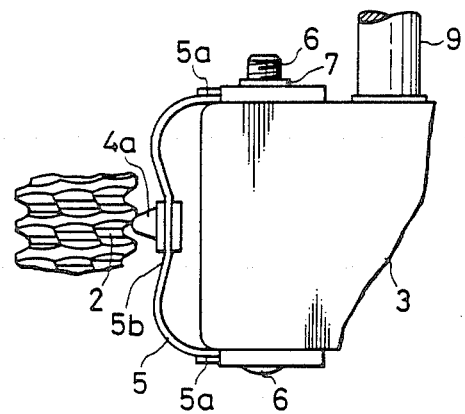
FIG. 6 is a fragmentary plan view of the conventional device shown in FIG. 4, for illustrating problems with the device.

Referring to FIGS. 1 and 2, there is shown a carriage-shifting device according to the present invention. This device has threaded shaft 1, the body of carriage 3, mating element 4, leaf spring 5, magnetic head 8, guide shafts 9 and 10 in the same way as the conventional device shown in FIG. 4. Since these components are denoted by the same reference numerals as in FIG. 4, they will not be described hereinafter. This novel device is characterized in that a retaining member 11 is mounted on the carriage 3. Specifically, the retaining member 11 is fastened with screws 6 to the wall surface of the carriage 3 on which the leaf spring 5 is mounted, i.e., the retaining member 11 overlaps the spring 5. The retaining member 11 is made of a metal sheet or plate and shaped so as to have a U shaped cross section. A substantially triangularly shaped support portion 11a extends from the central portion of the retaining member 11 toward the shaft 1. The front end of the support portion 11a is bent substantially vertically to form a retaining portion 11b that points toward the central axis of the shaft 1. As shown in FIG. 3 (A) and (B), the retaining portion 11b is so formed that it does not come into contact with the wall defining the groove 2. On the other hand the mating element 4 is in contact with the wall defining the groove 2 at all times.

In the structure describe above, when the shaft 1 is rotated fast or stopped suddenly or a strong external force is applied, the front end 4a of the mating element 4 may be pressed against one side of the wall defining the helical groove 2. Because the distance between both sides of this wall increases outwardly, and because the front end 4a assumes a somewhat rounded quadrangular pyramidal shape, a force is exerted that urges the front end 4a out of the groove 2. Further, the leaf spring 5 can deform in the same direction, i e., outwardly. Therefore, the front end 4a is about to disengage from the groove 2. However, the retaining portion 11b of the retaining member 11 has a rigidity sufficient to prevent the mating element 4 from disengaging from the groove 2 in the presence of a strong external shock, and it bears on the wall defining the groove 2. Thus, the front end 4a is stopped from moving away from the groove 2 by the retaining portion 11. Hence, the mating element 4 will not disengaged from the groove 2.

It is to be noted that the shape of the retaining member according to the invention is not limited to the above example.

As described thus far, in the novel device, the retaining portion of the retaining member mounted to the carriage is disposed in the helical groove. Therefore, even if a strong external shock acts in the direction to move the mating element away from the groove, the mating portion is prevented, from disengaging from the groove, because the retaining portion bears on the wall defining the groove. Consequently, the carriage can be moved and located precisely. Further, the carriage is prevented from running in an uncontrollable manner or colliding on other component; otherwise the carriage an the magnetic heads would become damaged.

What is claimed is:

1. A device for shifting a carriage on which a magnetic head is carried, comprising:
   a mating element mounted to the carriage;
   a threaded shaft having a helical groove extending around the periphery of the shaft provided with discrete groove portions angularly spaced one after the other in steps which are incrementally offset along an axial direction of the shaft, wherein the mating element engages in resilient contact in the helical groove against a wall defining the groove portions, the carriage being moved in incremental steps in the axial direction by rotating the shaft; and
   a retaining member mounted on the carriage and having a retaining portion extending immediately adjacent to but not in contact with the wall defining the groove portions of the helical groove,
   whereby in the event of an external shock acting to dislodge the mating element away from the helical groove, the masting element is prevented from disengaging from the groove because the retaining member bears against the wall of the groove.

2. A device for shifting a carriage as set forth in claim 1, wherein said retaining portion extends substantially perpendicularly to the axis of the shaft.

3. A device for shifting a carriage as set forth in claim 1, wherein the cross section of the helical groove takes a V-shaped form, and wherein the front end of the mating element takes a somewhat rounded quadrangular pyramidal shape.

4. A device for shifting a carriage as set forth in claim 1, wherein a substantially triangularly shaped portion extends from the body of said retaining member toward the shaft, and wherein said retaining portion extends from the front end of the triangularly shaped portion.

* * * * *